Sept. 9, 1924.                    T. HAMMOND                    1,507,732
                              CULTIVATOR ATTACHMENT
                                Filed Aug. 3, 1922
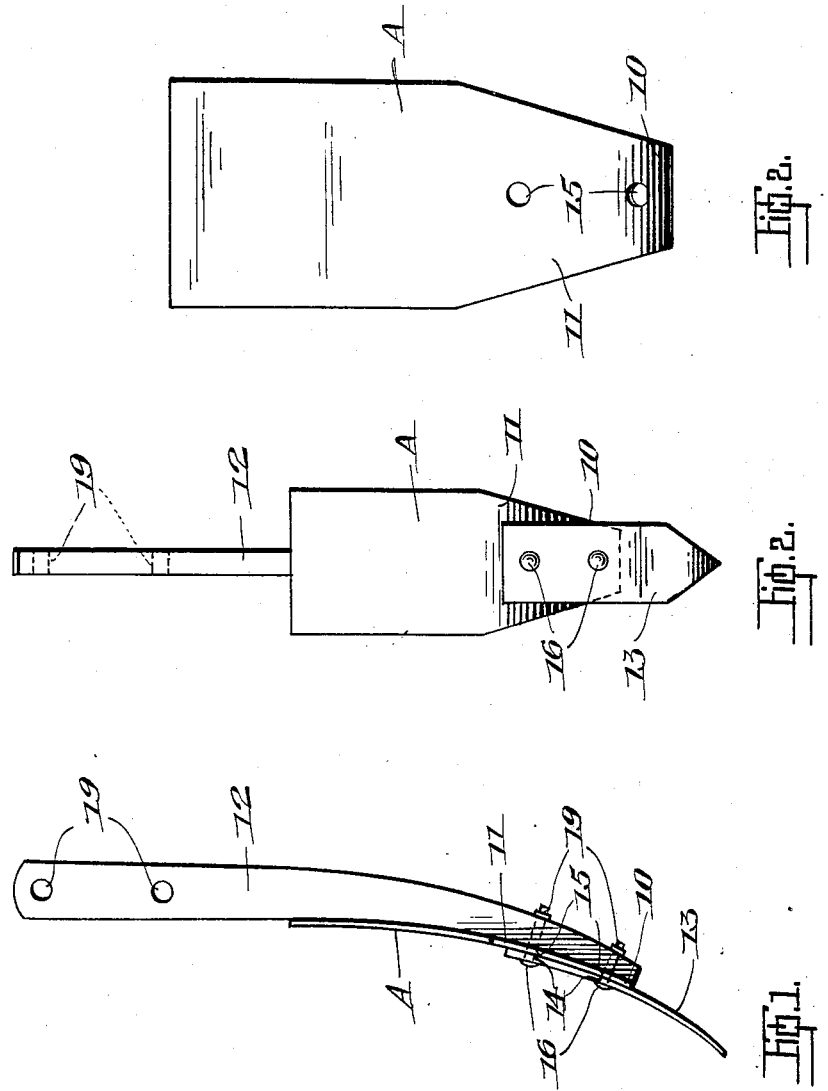
INVENTOR
THOMAS. HAMMOND.

Patented Sept. 9, 1924.

1,507,732

UNITED STATES PATENT OFFICE.

THOMAS HAMMOND, OF PINCHER STATION, ALBERTA, CANADA.

CULTIVATOR ATTACHMENT.

Application filed August 3, 1922. Serial No. 579,465.

*To all whom it may concern:*

Be it known that I, THOMAS HAMMOND, a subject of the King of Great Britain, and residing at Pincher Station, in the Province of Alberta and Dominion of Canada, have invented certain new and useful Improvements in Cultivator Attachments, of which the following is a specification.

This invention relates to improvements in cultivator attachments, and the object of the invention is to provide a simple and effective attachment of this kind for cultivator teeth which will prevent the earth drifting and protect the seed from being scattered by the wind.

With these and other objects in view, reference is now had to the accompanying drawings, in which like characters of reference indicate corresponding parts in each figure, and in which:

Figure 1 is a side elevation of a cultivator tooth with the attachment in position.

Figure 2 is a front elevation.

Figure 3 is a similar view of the attachment detached from the cultivator tooth.

In the drawings:

A designates the attachment or device as a whole comprising a metal plate square at one end and cut at the other end to form a restricted lower portion 10. This plate A is designed to form a shield 11 between the tooth of a cultivator and the means of support for the tooth and is accordingly designed to conform to the formation of the tooth supporting means.

The numeral 12 designates the cultivator tooth supporting member formed in the usual way partially bowed at its lower end adapted to receive thereon the tooth 13 having apertures 14 therethrough and behind the tooth as above mentioned, the narrowed end of the shield A also provided with apertures 15 registering with the apertures 14 in the tooth and adapted together to receive therethrough and through the supporting member, the securing bolts 16 provided with nuts 17. The numeral 19 designates orifices in the top of the tooth supporting member adapted to receive therethrough, securing means whereby the said member is secured to the cultivator in any well-known manner.

From the foregoing, it will be seen that my device forms a protection and a shield for the seed against the wind, and prevents in operation the earth or soil from drifting.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A device of the character described and in combination with a cultivator standard having a cultivator tooth fixedly secured thereon, a rectangular plate adapted to form a shield above said tooth and formed with a restricted lower end to fit between the tooth and the standard and securing means through the tooth and through the standard and said plate.

2. A device of the character described comprising, in combination with a cultivator standard and a cultivator tooth on said standard, a rectangular metal plate adapted to fit between said standard and said tooth and to conform to the contour of the standard, the upper portion of said plate being adapted to form a shield extending upwardly beyond the inner end of the tooth, said plate being cut adjacent the lower end to form a restricted end portion extending between the cultivator tooth and the cultivator standard and having apertures therein registering with apertures in the tooth and the standard and means extending through said apertures for fixedly securing the plate, the tooth and the standard together.

In witness whereof I have hereunto set my hand in the presence of two witnesses.

THOMAS HAMMOND.

Witnesses:
FRED LUTHER MONTGOMERY,
EDITH BLANCHE GREGORY.